United States Patent
Hugosson et al.

(10) Patent No.: US 6,442,612 B1
(45) Date of Patent: Aug. 27, 2002

(54) DEVICE AND METHOD FOR COMMUNICATION OVER A NETWORK

(75) Inventors: Fredrik Hugosson; Harald Ripa, both of Lund (SE)

(73) Assignee: Axis AB, Lund (SE)

( * ) Notice: Subject to any disclaimer, the term of this patent is extended or adjusted under 35 U.S.C. 154(b) by 0 days.

(21) Appl. No.: 09/259,540

(22) Filed: Mar. 1, 1999

(30) Foreign Application Priority Data

Feb. 17, 1999 (SE) .............................................. 9900516

(51) Int. Cl.[7] .............................................. C06F 15/177
(52) U.S. Cl. ...................................... 709/230; 709/220
(58) Field of Search ........................... 703/21; 709/203, 709/213, 230, 250, 220

(56) References Cited

U.S. PATENT DOCUMENTS

| | | | |
|---|---|---|---|
| 5,410,754 A | | 4/1995 | Klotzbach et al. .......... 370/466 |
| 5,636,333 A | | 6/1997 | Davidson, Jr. et al. .... 358/1.15 |
| 5,699,350 A | * | 12/1997 | Kraslavsky .................. 370/254 |
| 5,881,269 A | * | 3/1999 | Dobbelstein .................. 703/21 |
| 5,978,841 A | * | 11/1999 | Berger ......................... 709/217 |
| 5,978,912 A | * | 11/1999 | Rakavy et al. .................. 713/2 |
| 6,055,236 A | * | 4/2000 | Nessett et al. .............. 370/389 |
| 6,101,533 A | * | 8/2000 | Brandt et al. ................ 709/213 |
| 6,226,680 B1 | * | 5/2001 | Boucher et al. ............. 709/230 |
| 6,256,322 B1 | * | 7/2001 | Wilson, Jr. ................... 370/469 |
| 6,282,642 B1 | * | 8/2001 | Cromer et al. .................. 713/2 |
| 6,314,525 B1 | * | 11/2001 | Mahalingham et al. ........ 714/4 |

OTHER PUBLICATIONS

Int'l Search Report PCT/SE 00/00259 Int'l Filing date Feb. 10, 2000 Applicant: AXIS AB et al.
1998 Int'l Zurich Seminar on Broadband Comm., 1998. Transmission, Networking. Proceedings, Pronk V. et al.: "*A performance analysis of the Bit–Map access protocol for shared–medium networks*", pp. 69–73, abstract, sect. 1.

* cited by examiner

*Primary Examiner*—N. Le
*Assistant Examiner*—Walter Benson
(74) *Attorney, Agent, or Firm*—Charles C. Cary; Cary & Kelly, LLP

(57) ABSTRACT

The present invention relates to a system for communication over a network. The System comprises a network application, a protocol stack and a Medium Access Control layer. Further, the system is functionally and physically divided into a network application device and a network interface device. The network application device comprises the network application and the network interface device comprises the protocol stack and the MAC layer. A physical interface for bidirectional communication is arranged between the two devices. Also, the invention relates to the network application device and the network interface device separately and to a method for transmitting and receiving information via the network.

10 Claims, 3 Drawing Sheets

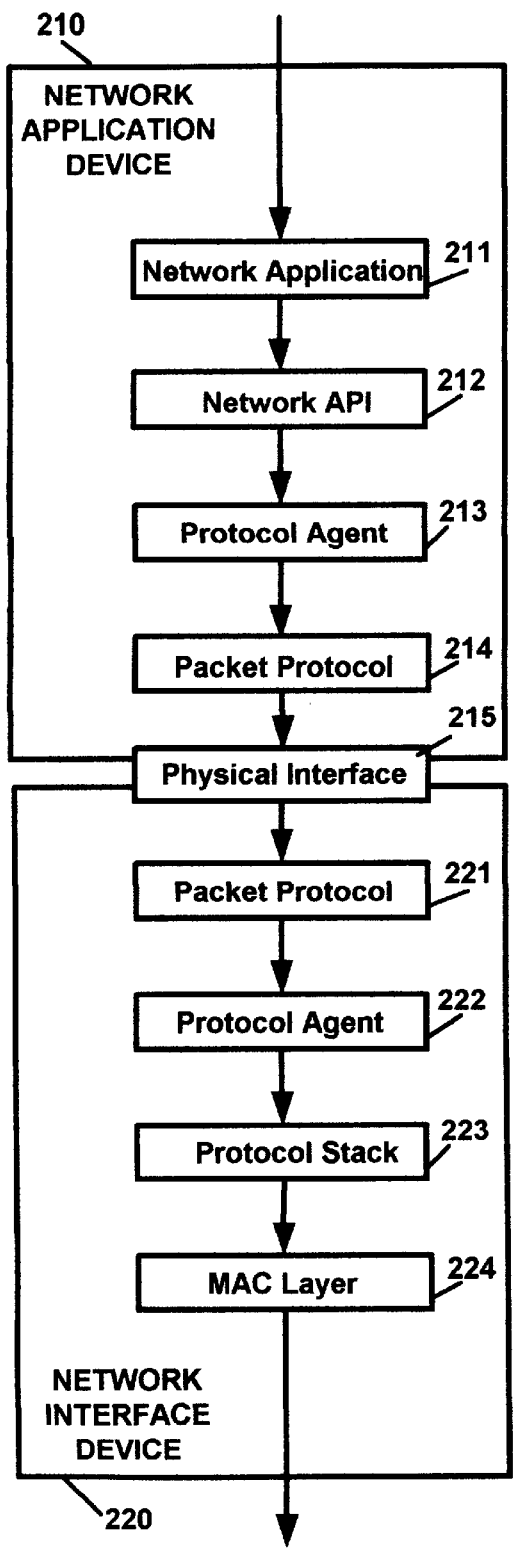
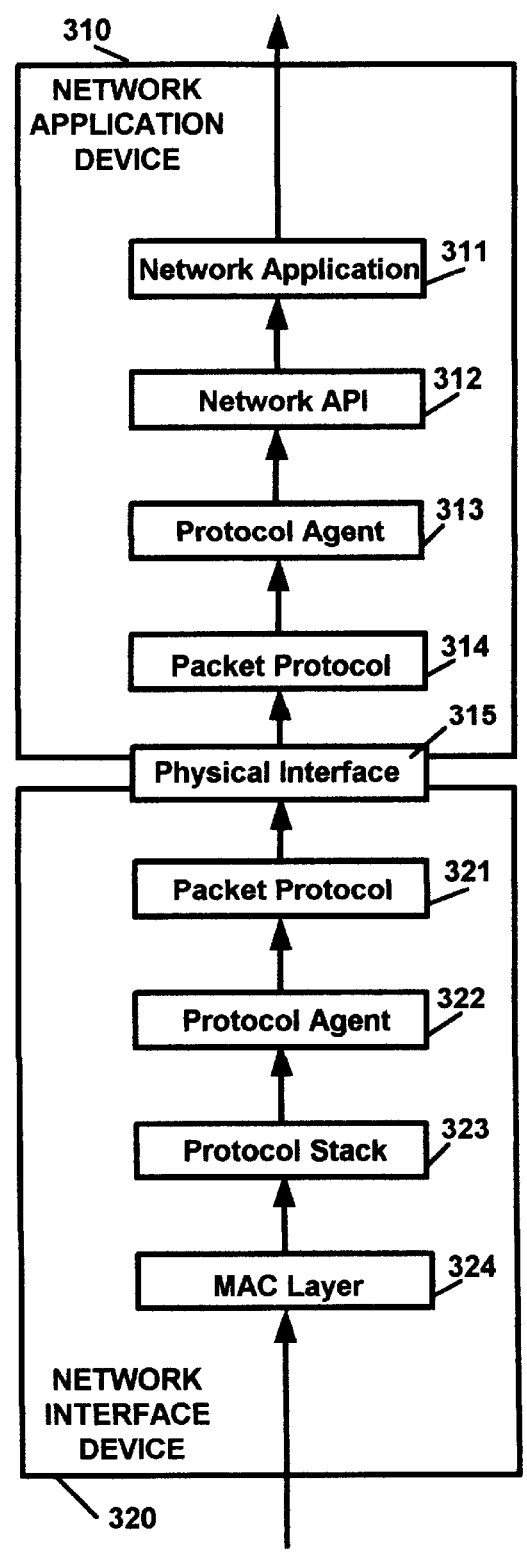
FIG. 3                    FIG. 4

DEVICE AND METHOD FOR COMMUNICATION OVER A NETWORK

PRIORITY CLAIMED

This application claims the benefit of priority to Swedish Application No. 9900516-7, filed on Feb. 17, 1999, entitled, Device And Method For Communication Over A Network, which is incorporated by reference as if fully set forth herein.

TECHNICAL FIELD

The present invention relates to a system for communication over a network and comprising a network application, a network protocol stack having protocols, for transmission control and path control, and further comprising a Medium Access Control layer (MAC layer) for transforming information for communication between the system and the network.

The invention also relates to two devices forming part of the system and to a method for communication over a network.

BACKGROUND OF THE INVENTION

Devices for communication over a network of the above-mentioned type are commonly known, e.g. network interface cards (NIC), and are usually used to connect peripheral units such as printers, scanners, and CD units to a network. However, according to this solution the manufacturer and the developer of peripheral units are highly dependent on the NIC supplier since an enhancement or a further development of the peripheral unit in many cases leads to the need for implementation of a new interface for the NIC. This might give rise to heavy expenses and be highly time-consuming. Even if the manufacturer of the peripheral unit only wants to make changes in the way the unit is presented to other network units, it is usually necessary for the NIC supplier to be involved.

Other known devices for communication over a network are network cards. These are commonly used to connect a powerful system, such as a computer or a server, to the network. Therefore, only a MAC layer is normally implemented on the network card. The information to be sent over the network is transformed by the network card to suit the network. If the unit intended for communication over a network should be able to utilize such a network card, its internal system must be able to handle a large amount of extra program code. However, the usually small amount of free internal system resources, which is left when the unit is optimized for its purpose, is not sufficient to handle said extra program code.

SUMMARY OF THE INVENTION

The object of the present invention is to point out a solution to the above-mentioned problems by granting a manufacturer of network application devices greater liberty to develop new network application devices or develop existing network application devices further, resulting in less cost and time-consumption for the development or the further development and enabling the manufacturer to use an existing internal system of a network application device without losing the advantages mentioned above.

These objects as well as other objects that will become apparent from the following description, are now achieved by a system of the type mentioned by way of introduction and further comprising the features in the claims.

According to the invention the system comprises two devices, namely a network application device and a network interface device. The network application device can be a device of any kind, for example, a printer, an industrial robot, a control unit or a gauge for a process, that is intended to be connected to a network for sending information thereto or for receiving information from equipment connected to the network. The network application device comprises a network application which for example may be formed by any of the protocols for http, Telnet, FTP, SNMP or SMTP, and a network API (Application Programming Interface), which for example may be a Berkeley sockets API, a Winsock2 API or a Java Sockets API.

The network interface device is situated between the network application device and the network, and it comprises a protocol stack which for example may comprise protocols for TCP/IP, NetWare, NetBIOS/NetBEUI or AppleTalk, and a MAC layer, which for example may be an implementation of CSMA/CD, Token bus or Token ring. Between these two devices, a physical interface is provided, which makes it possible to transmit information between the two devices.

The invention gives rise to a number of advantages. Manufacturers of applications will be able to easily implement new or altered applications and protocols on top of the existing protocol stack without any involvement of the manufacturer of network interface devices. It will also be possible to henceforth use an existing internal system or an existing CPU, because of the fact that most processor and memory requiring parts regarding network communication, such as the protocol stack, are situated in the network interface unit, and new protocol standards may be added by the manufacturer of network interface devices without the need for the manufacturer of applications to reprogram or rebuild the network application device.

According to one advantageous embodiment of the invention, a network application programming interface (API) is provided in the network application device between the network application and the physical interface with respect to information transport. One advantage thereof is that development and testing of network applications may be performed from almost any platform, as long as it is able to use the same network API as the network application device.

According to another advantageous embodiment of the invention, a packet-based protocol is provided in connection with the physical interface for communication between the network application device and the network interface device. One specific advantage thereof is that no changes of a logical interface or the physical interface are required during development, enhancement and updating of e.g. the protocol stack, the network application or the application. Another advantage thereof is that no change is required in the network application when enhancements are added to the protocol stack.

According to another advantageous embodiment, the physical interface is of the type having two co-acting interface means, which admit simple connection with and disconnection from each other. Consequently, each device of the system can be tested separately. Also, initial tests of the network application device can be performed by an application simulated in a computer.

BRIEF DESCRIPTION OF THE DRAWINGS

The invention will now be described in more detail with reference to the accompanying drawings, which show a presently preferred embodiment of the invention.

FIG. 3 is a flow chart of the information path through the system during transmission.

FIG. 4 is a flow chart of the information path through the system during receiving.

DETAILED DESCRIPTION OF A PREFERRED EMBODIMENT

Figure 1:
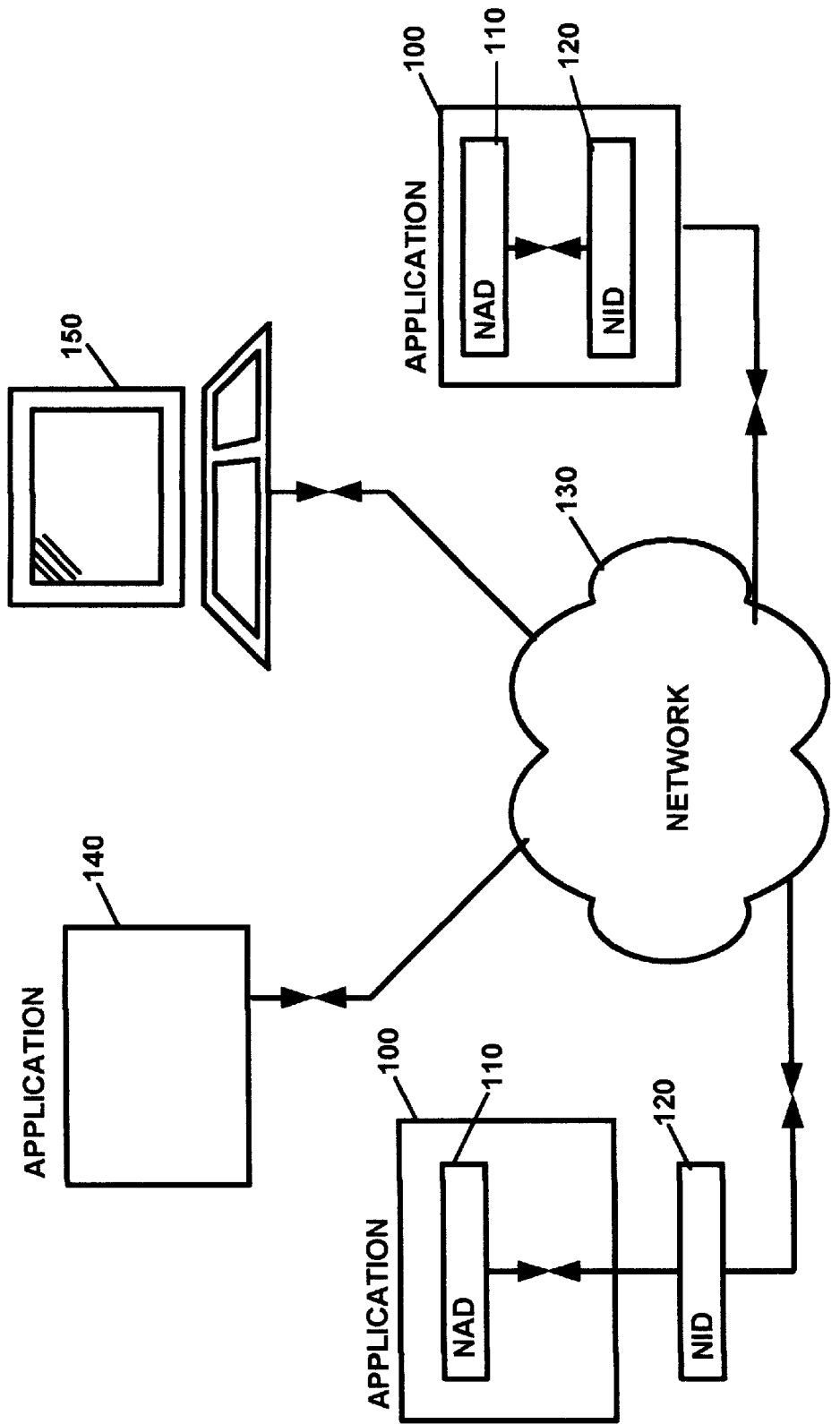
FIG. 1 is a schematic of the system in a typical environment.

With reference to FIG. 1, there is described a network 130 and units of different types connected thereto, such as computers 150, control equipment, other applications not comprising the system of the invention 140 or other applications comprising the system of the invention 100. The application using the system 100 is intended to communicate over the network 130 with different units connected thereto. The arrows on the lines connecting units to each other or to the network 130 symbolize bidirectional communication.

Figure 2:
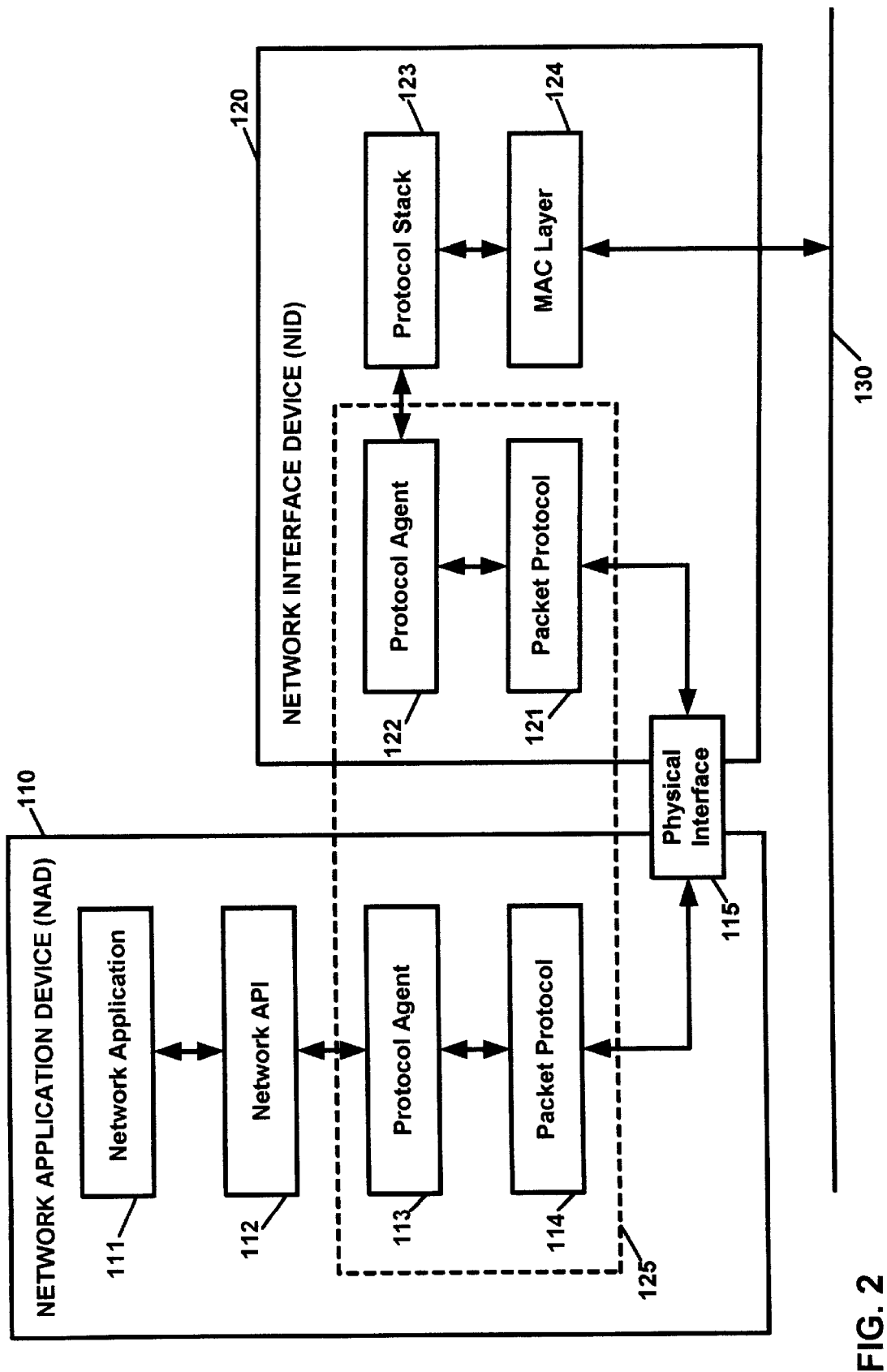
FIG. 2 is a block diagram of the system.

With reference to FIG. 2, a preferred embodiment of the system comprises a network application device (NAD) 110 and a network interface device (NID) 120.

The network application device 110 is a device which is intended to be connected to a network. Such a device could be, for example, a printer, an industrial robot, a control unit or a gauge for a process. The network application device 110 is preferably equipped with a CPU and memory units as well as hardware to perform other tasks than communicating over the network. Further, a network application 111 is implemented in the form of a Web Server and an HTTP protocol, a network API 112, in the form of a standard network API, a packet protocol 114, in the form of IEEE 1284.4, a protocol agent 113 which transforms the information that the network application via the API intends to send with the packet protocol to a format that is suitable for the packet protocol 114.

The network interface device (NID) 120 is in itself an interface between the NAD 110 and the network 130. In the NID 120 there are implemented a packet protocol 121 corresponding to the packet protocol 114 in the NAD 110, a protocol agent 122 corresponding to the one 113 present in the NAD 110, a protocol stack 123 in the form of a TCP, an IP and an LLC protocol (Logical Link Control), a MAC layer (Medium Access Control), e.g. in the form of an implementation of CSMA/CD and a connection to the network. In the NID the physical network interface is implemented according to IEEE 802.3.

A physical interface 115 is located between the NAD 110 and the NID 120. If the NAD 110 and the NID 120 are implemented on the same printed circuit card, the physical interface 115 could be in the form of conductors between the two devices. If they are implemented on separate printed circuit cards, then the physical interface 115 could be a male and a female connector, which are connected either directly to each other or by a cable, arranged on the cards respectively. Another possibility is to put a female connector on one of the cards and make the conductors of the other card reach the edge of that card, which then is inserted in the connector for establishing contact.

A logical interface 125 is defined by the protocol agents 113, 122 and the packet protocols 114, 121. With reference to FIG. 3 there is described in which order and by which internal unit information is treated in a preferred embodiment when information is intended to be sent to the network. The information that the NAD 210 wishes to present via the network is sent to the network application 211, where the web server structures the information. From the network application, the processed and structured information is sent to a network API 212, where the information is structured into a general format required by the protocol stack. Then information is sent further to the protocol agent 213 where the information is adapted to the packet protocol 214. The packet protocol 214 in the form of an IEEE 1284.4 protocol then takes care of the information and sends it on a data channel to the packet protocol 221, which is implemented in the NID 110, via the physical interface 215. The two packet protocols 214, 221 works as a peer-to-peer connection. After the packet protocol 221, a protocol agent 222 takes care of the information, and also this agent works as a peer protocol in relation to the corresponding protocol agent 213. The protocol agent 222 transforms the information back to the form it had before it was processed by the previous protocol agent 213 and transmits it on to the protocol stack 223. As a result, the protocol stack 223 will see the information as if it came immediately from the network API. The protocol stack in the form of a TCP, IP and LLC protocol processes and administrates the information based on the instructions received. Subsequently this processed information is sent further on to the MAC layer 224 where the information is given features necessary to send it over the network, such as being adapted to CSMA/CD standard, whereupon it is sent on the network.

With reference to FIG. 4 there is described in which order and by which internal unit information is processed in a preferred embodiment when the information is received from the network. Information intended for the application and coming from the network is received and treated by the MAC layer 324, to be forwarded to the protocol stack 323. The different protocols, in this case the protocols for TCP, IP and LLC, in the protocol stack 323 process and administrate the information according to each protocol. This processed information generated by the protocol stack 323 is then sent further on to the protocol agent 322, where it is adapted to the packet protocol 321. The packet protocol 321, in the form of a protocol according to the IEEE 1284.4 standard, then takes care of the information and sends it on a data channel to the packet protocol 314, which is implemented in the NAD 120, via the physical interface 315.

The packet protocols work like a peer-to-peer connection.

After the packet protocol, a protocol agent 313 takes care of the information. Also the protocol agent works as a peer protocol relative to its corresponding protocol agent 322. The protocol agent 313 reproduces the information in the form it had before being treated by the previous protocol agent 322. The information is then passed on to the network API 312, where the information is structured into a general format required by the network application 311. From the network API, the information is sent further on to the network application 311.

What is claimed is:

1. A system for communication over a network; comprising:

a network application device having a network application, an associated application programming interface (API) structuring information from the network application for subsequent processing by a network protocol stack and a first peer-to-peer communication means coupled with the API for passing network information to and from the network application; and with said network application device lacking a network protocol stack for processing the network information to and from the API; and a network interface device coupled between the network application device and the network, and the network interface device having a network protocol stack, a medium access control (MAC) coupled with the network, and a second peer-to-peer communications means coupled with the first peer-to-peer communications means of said network application device to provide a communication link therewith, and with the network protocol stack coupled between the MAC and the second peer-to-peer communication means to execute a complete and standard set of layered network protocol processes on network information passing to and from the network via the MAC and the communication link.

2. The system according to claim 1, wherein the communication link provided by the first and second peer-to-peer connection means between the network application device and the network interface device respectively corresponds with an IEEE 1284.4 protocol.

3. The system according to claim 1, wherein the communication link exhibits a packet-based protocol for bi-directional, connection-oriented, peer-to-peer communications between the network application device and the network interface device.

4. The system according to claim 1, wherein the network application device comprises at least one of: a printer, a robot, a control unit and a gauge.

5. The system according to claim 1, wherein the set of network protocol processes executed by the network stack includes at least one protocol selected from among a group of network protocols consisting of: TCP/IP, NetWare, Net BIOS, NetBEUI and Apple Talk.

6. The system according to claim 1, further comprising:

complementary connectors for separably coupling the network application device to the network interface device via the first and second peer-to-peer communication means.

7. A method of communicating over a network for a network application device coupled via a network interface device with the network, and the method for communicating comprising:

sending network information from a network application, to an application programming interface (API) both provided in the network application device, lacking a network protocol stack for processing the network information to and from the API transforming, in the API, the network information to a format readable by a network protocol stack;

transporting the network information transformed in said step of transforming, from the network API to the network interface device;

processing the network information transported from the network application device in said transporting act, in a complete and standard network protocol stack provided in the network interface device; and coupling the network information processed in said processing act to the network with a medium access control (MAC) provided in the network interface device.

8. The method according to claim 7, wherein the transporting act further comprises the act of:

implementing network information transport with an IEEE 1284.4 protocol.

9. A method of communicating over a network for a network application device coupled via a network interface device with the network, and the method for communicating comprising:

receiving network information from the network at a medium access control (MAC) provided in the network interface device;

processing the network information received in said receiving act in a complete and standard network protocol stack provided in the network interface device;

transporting the network information processed in said processing act, from the network protocol stack to the network application device, and network application device lacking a network protocol stack for processing the network information to and from the API transforming the network information transported in said transporting act in an application programming interface (API) provided in the network application device; and transmitting the network information transformed in said transforming act to a network application provided in the network application device.

10. The method according to claim 9, wherein the transporting act further comprises the act of:

implementing network information transport with an IEEE 1284.4 protocol.

* * * * *